J. SCHOWANEK.
MACHINE FOR PRODUCING TRINKETS FROM WOOD, &c.
APPLICATION FILED JULY 6, 1914.

1,180,884. Patented Apr. 25, 1916.

Witnesses:

Inventor:
Johann Schowanek,
by L. K. Böhm,
Attorney.

UNITED STATES PATENT OFFICE.

JOHANN SCHOWANEK, OF ALBRECHTSDORF, AUSTRIA-HUNGARY.

MACHINE FOR PRODUCING TRINKETS FROM WOOD, &c.

1,180,884.

Specification of Letters Patent.

Patented Apr. 25, 1916.

Application filed July 6, 1914. Serial No. 849,350.

*To all whom it may concern:*

Be it known that I, JOHANN SCHOWANEK, a citizen of the Empire of Austria-Hungary, and a resident of Albrechtsdorf, Bohemia, Austria-Hungary, have invented certain new and useful Improvements in Machines for Producing Trinkets from Wood, &c., of which the following is a specification.

This invention has reference to improvements in machines for producing trinkets and small ornamental fancy articles such as pearls, beads, buttons and the like made of wood, celluloid, ivory, horn, artificial horn and different compositions of cellulose and similar materials. Such small fancy articles are used for ornaments and trimmings for gowns, hand bags, necklaces, ornamental strings and bracelets. These articles were usually made by means of a steel tool which acted on the rotating material, usually a rod. This steel tool shaped the article and another one cut it off from the rod of material. This device was defective because the shaping steel tool became dull too easily and had to be replaced very frequently. The shaping steel tool when becoming dull did not produce clean articles and finishing had to be done involving loss of time and wages.

It is the purpose of the present invention to overcome the described defects. This has been primarily attained by employing one or more rotatable emery-disks or similar devices of a desired cross-section which disks are laterally advanced toward the rotating rod of material. By means of such rotatable abrasive disk a small article is produced in a single operation and directly polished and finished. This is one of the essential features of the present invention.

Figure 2:
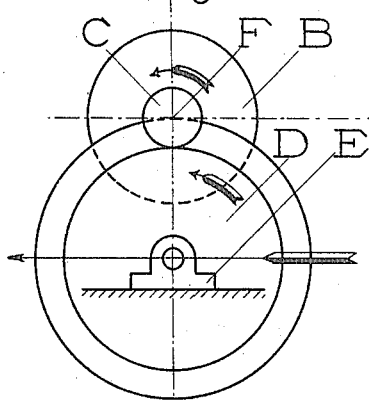
Figure 1:
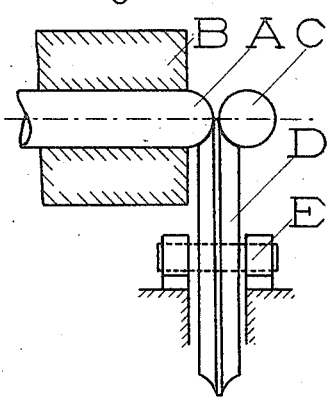
Figure 4:
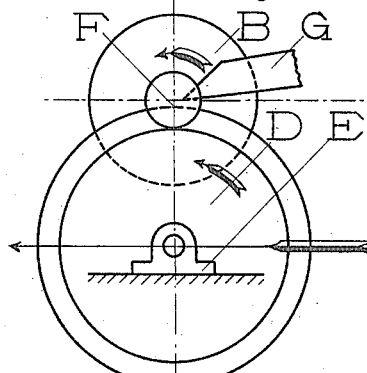
Figure 3:
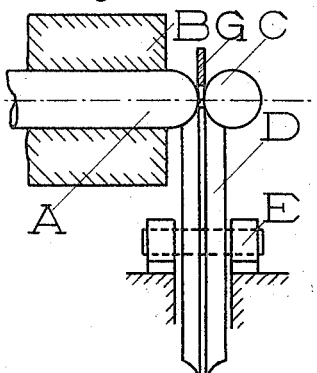
Figure 5:
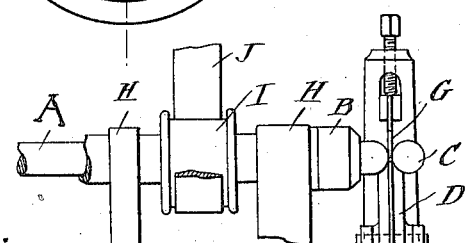

In order to render the invention entirely clear reference is had to the accompanying drawing in which:

Figure 1 represents in longitudinal section a machine for producing trinkets and the like embodying in desirable form the present improvements. Fig. 2 is a diagrammatical plan of the machine. Fig. 3 illustrates the machine in a similar longitudinal section to Fig. 1. Fig. 4 is a similar diagrammatical plan view to Fig. 2. Fig. 5 is a view similar to Figs. 1 and 3.

Similar characters of reference denote like parts in all the figures.

The material A forming the work piece is fed through the rotatable chuck B and usually consists of a rod which is mounted in the chuck B so that it may be brought forward according to any approved manner and clamped tightly after it has been sufficiently advanced and accordingly rotates with the chuck B.

For the production of the single small fancy articles, for instance a pearl, bead or button, the rotating work piece is, according to the present invention, acted on by a rotating emery-disk or similar disk having an abrasive effect. The disk D is mounted upon a sleigh support E and may be shifted lengthwise upon said support. It is adjusted so that the vertical center point F of the disk D passes through the axis of rotation of the material, see Figs. 1 and 2.

As shown in Fig. 5 the work piece A is held by the head stock H. Power is applied by means of the pulley I and belt J.

The shaping and cutting off of the single fancy articles from the rod A accordingly is effected by the abrasive action of the disk D. The described arrangement permits of advancing the disk D sufficiently toward the rod to gradually shape the article and to cut same off. The great speed of rotation of the shaping tool, that is the disk D, increased by the speed of the rotating work piece or rod renders it possible that an article may be finished more quickly than with a steel tool, and second, the ground surface of the small fancy article attains a high finish and does not require any further work.

As waste material merely dust results which may be removed at once by approved suction methods directly from the place where it is produced, while in former manufacture relatively large shavings were formed by the shaping steel tool. These shavings often were the cause of disturbances when accidentally clamped in certain machine parts.

By the use of the described tools an interruption of the work on account of required changes of steel tools is not necessary. On the contrary, the work may be continued without interruption whereby a larger production per unit of time is obtained.

For the purpose of preventing a profile of the emery-disk or similar abrasive tool which is too sharp, the vertical center point F of the disk D may be somewhat below the axis of rotation of the material or rod, The small fancy article is then shaped as described and in order to cut off the article the support E may be provided with a steel tool G. This tool moves with the support E and is so arranged that it cuts off the article immediately after the same has been shaped and finished by the abrasive tool, as shown in Figs. 3 and 4.

I claim as my invention:

1. A machine for producing finished pearls, beads, buttons and similar trinkets of wood, celluloid, horn, ivory and artificial compositions in a single operation, comprising a rotatable chuck adapted to hold the work piece, a rotatable abrasive shaping tool having an abrasive working surface adapted to finish one-half of a fancy article and one-half of the next one, and means for advancing said tool toward the working piece.

2. A machine for producing finished pearls, beads, buttons, and similar trinkets of wood, celluloid, horn, ivory and artificial compositions in a single operation, comprising a rotatable chuck for holding the work piece, a rotatable abrasive shaping disk having a circumference finishing one-half of an article and one-half of the next one so that one article is produced by each single operation, and means for advancing the disk toward the work piece, so arranged that the vertical center point of the disk passes approximately through the axis of rotation of the work piece.

Signed at Leipzig, Germany, this 16th day of June, 1914.

JOHANN SCHOWANEK.

Witnesses:
WOLDEMAR RÖHR,
RUDOLPH FRICKE.